United States Patent [19]

Matsuyama

[11] Patent Number: 5,220,367
[45] Date of Patent: Jun. 15, 1993

[54] CAMERA USING FILM WITH MAGNETIC STORAGE PORTION

[75] Inventor: Shinichi Matsuyama, Tokyo, Japan

[73] Assignee: Canon Kabushiki Kaisha, Tokyo, Japan

[21] Appl. No.: 743,501

[22] Filed: Aug. 9, 1991

[30] Foreign Application Priority Data

Aug. 14, 1990 [JP] Japan .................................. 2-214635

[51] Int. Cl.$^5$ .............................................. G03B 17/24
[52] U.S. Cl. ...................................................... 354/105
[58] Field of Search .................... 354/105, 106, 75, 76

[56] References Cited

U.S. PATENT DOCUMENTS 4,860,037  8/1989  Harvey ................................. 354/21

Primary Examiner—Michael L. Gellner
Assistant Examiner—David M. Gray
Attorney, Agent, or Firm—Fitzpatrick, Cella, Harper & Scinto

[57] ABSTRACT

A camera using a film with a magnetic storage portion, includes reading means for reading out information from the magnetic storage portion of the film, judgment means for judging whether or not the information is properly read out by the reading means, and control means for, when the judgment means judges that the reading operation of the information is not properly performed, feeding the film to a position where the reading operation is not properly performed, and causing the reading means to perform the reading operation again.

26 Claims, 15 Drawing Sheets

FIG. IA
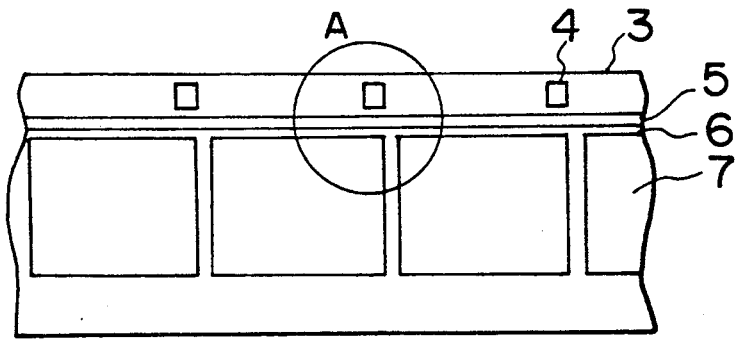
FIG. IB
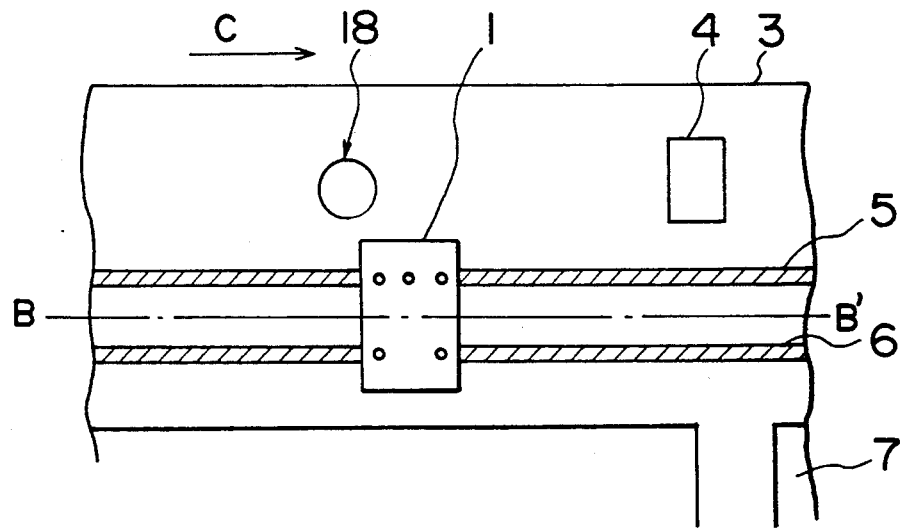
FIG. IC
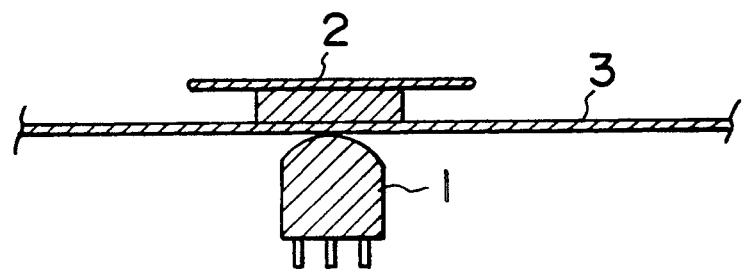

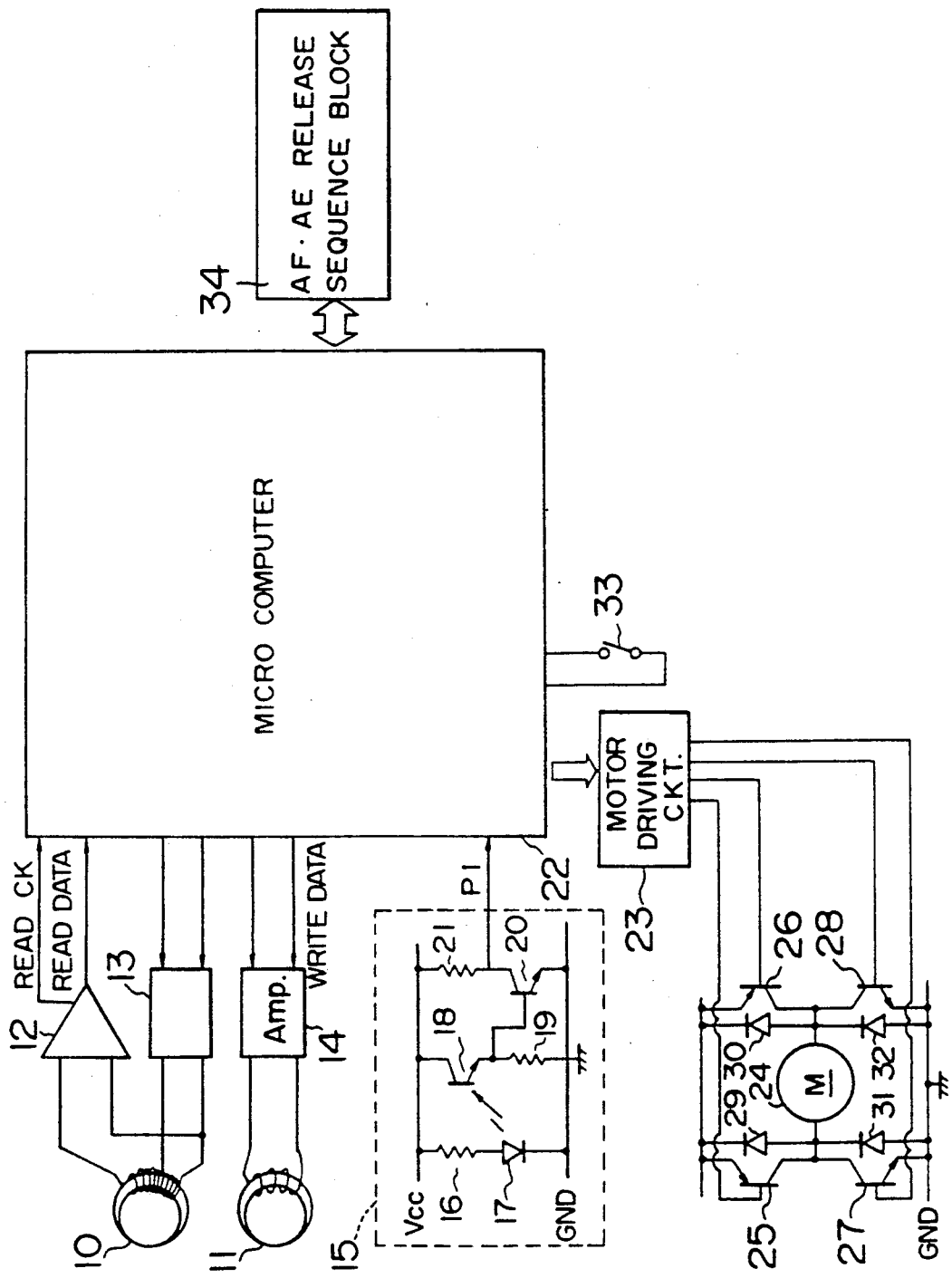

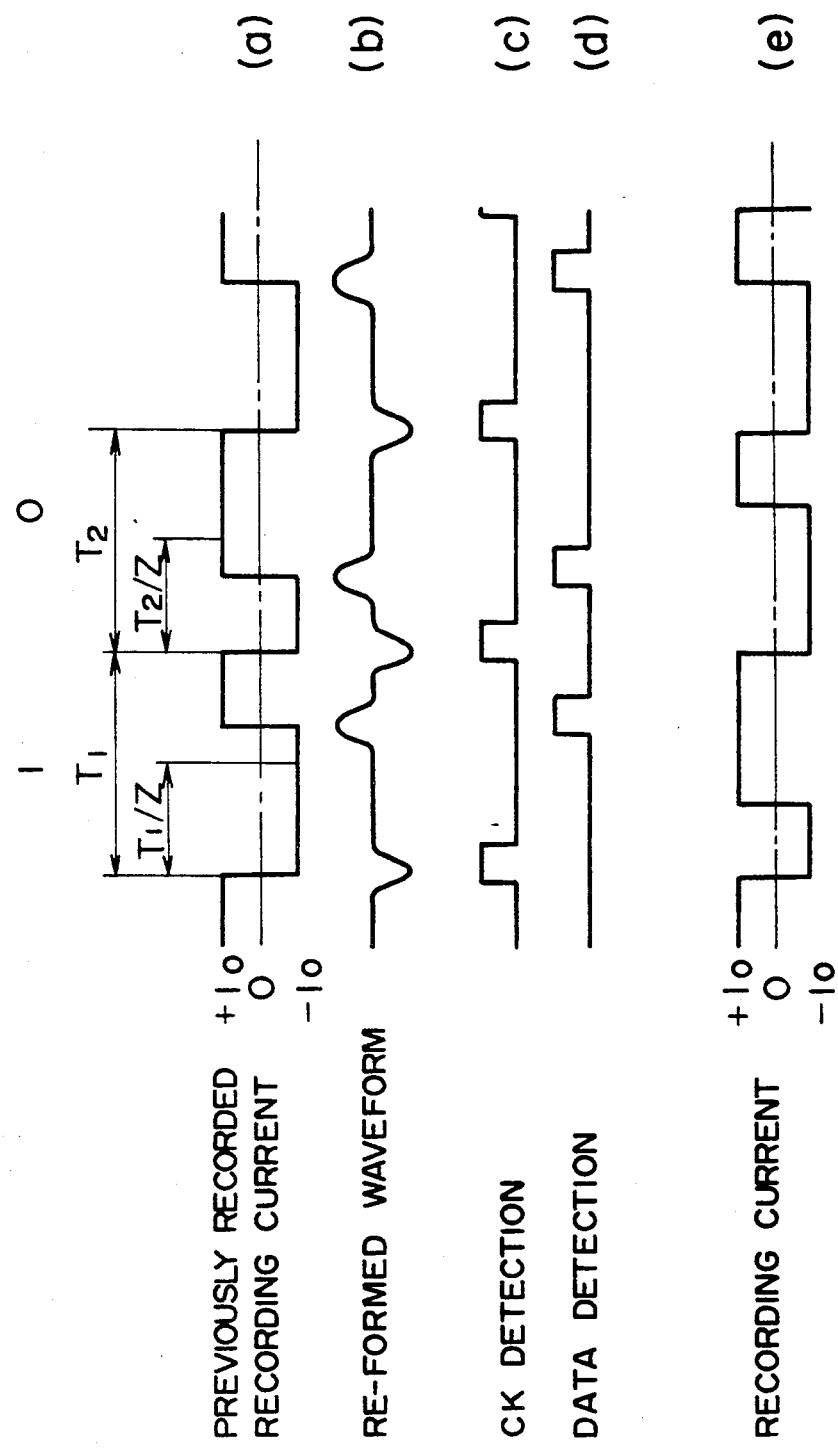

FIG.7

| DATA | | | | | ISO |
|---|---|---|---|---|---|
| bit 7 | bit 6 | bit 5 | bit 4 | bit 3 | |
| 1 | 1 | 1 | 1 | 1 | 5000 |
| 1 | 0 | 1 | 1 | 1 | 4000 |
| 0 | 1 | 1 | 1 | 1 | 3200 |
| 1 | 1 | 1 | 1 | 0 | 2500 |
| 1 | 0 | 1 | 1 | 0 | 2000 |
| 0 | 1 | 1 | 1 | 0 | 1600 |
| 1 | 1 | 1 | 0 | 1 | 1250 |
| 1 | 0 | 1 | 0 | 1 | 1000 |
| 0 | 1 | 1 | 0 | 1 | 800 |
| 1 | 1 | 1 | 0 | 0 | 640 |
| 1 | 0 | 1 | 0 | 0 | 500 |
| 0 | 1 | 1 | 0 | 0 | 400 |
| 1 | 1 | 0 | 1 | 1 | 320 |
| 1 | 0 | 0 | 1 | 1 | 250 |
| 0 | 1 | 0 | 1 | 1 | 200 |
| 1 | 1 | 0 | 1 | 0 | 160 |
| 1 | 0 | 0 | 1 | 0 | 125 |
| 0 | 1 | 0 | 1 | 0 | 100 |
| 1 | 1 | 0 | 0 | 1 | 80 |
| 1 | 0 | 0 | 0 | 1 | 64 |
| 0 | 1 | 0 | 0 | 1 | 50 |
| 1 | 1 | 0 | 0 | 0 | 40 |
| 1 | 0 | 0 | 0 | 0 | 32 |
| 0 | 1 | 0 | 0 | 0 | 25 |

| DATA | | FLAME NO |
|---|---|---|
| bit 3 | bit 2 | |
| 0 | 0 | 12 |
| 0 | 1 | 20 |
| 1 | 0 | 24 |
| 1 | 1 | 36 |

| bit | NEGA./POSI. |
|---|---|
| 1 | NEGA. |
| 0 | POSI. |

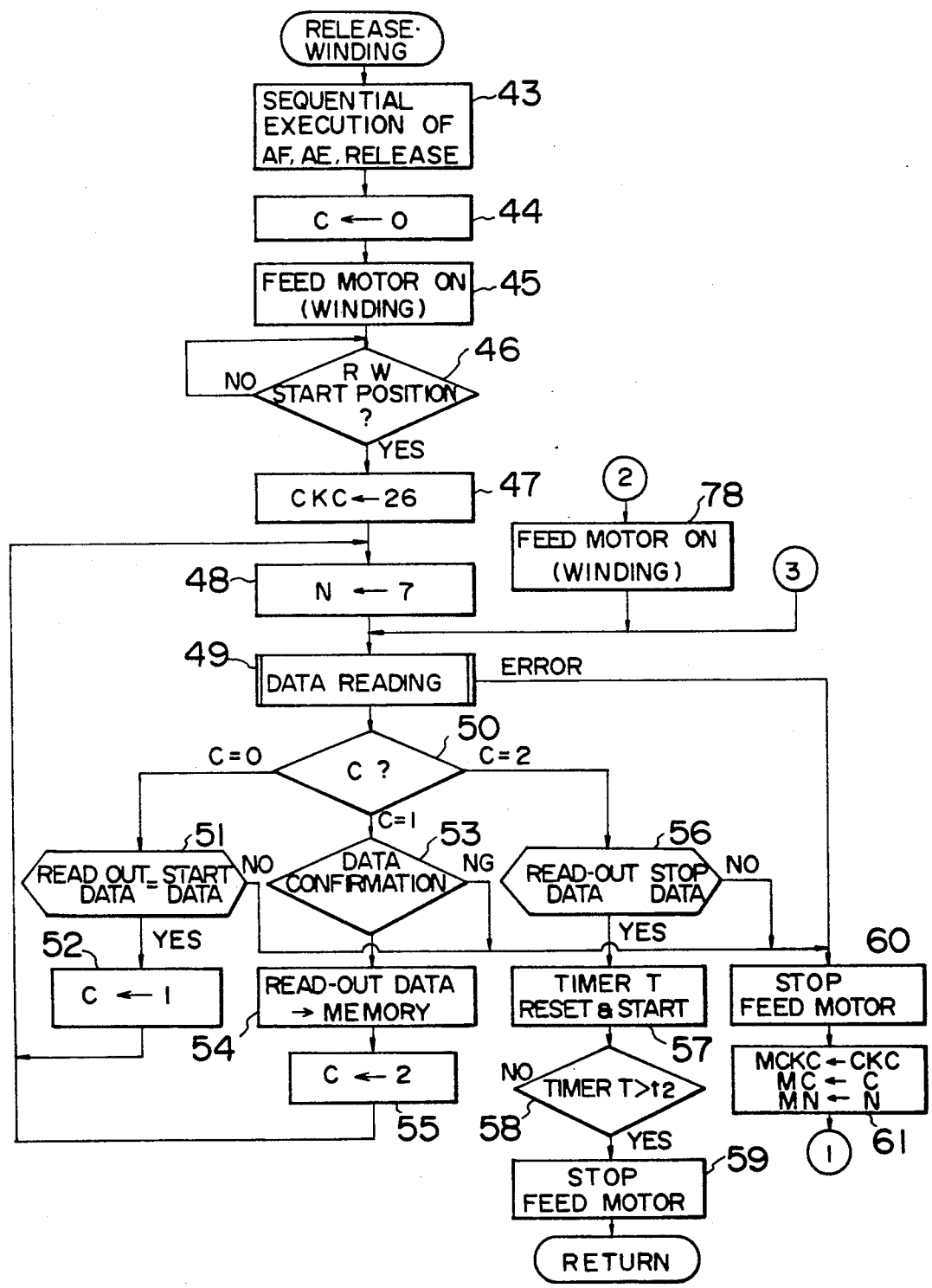

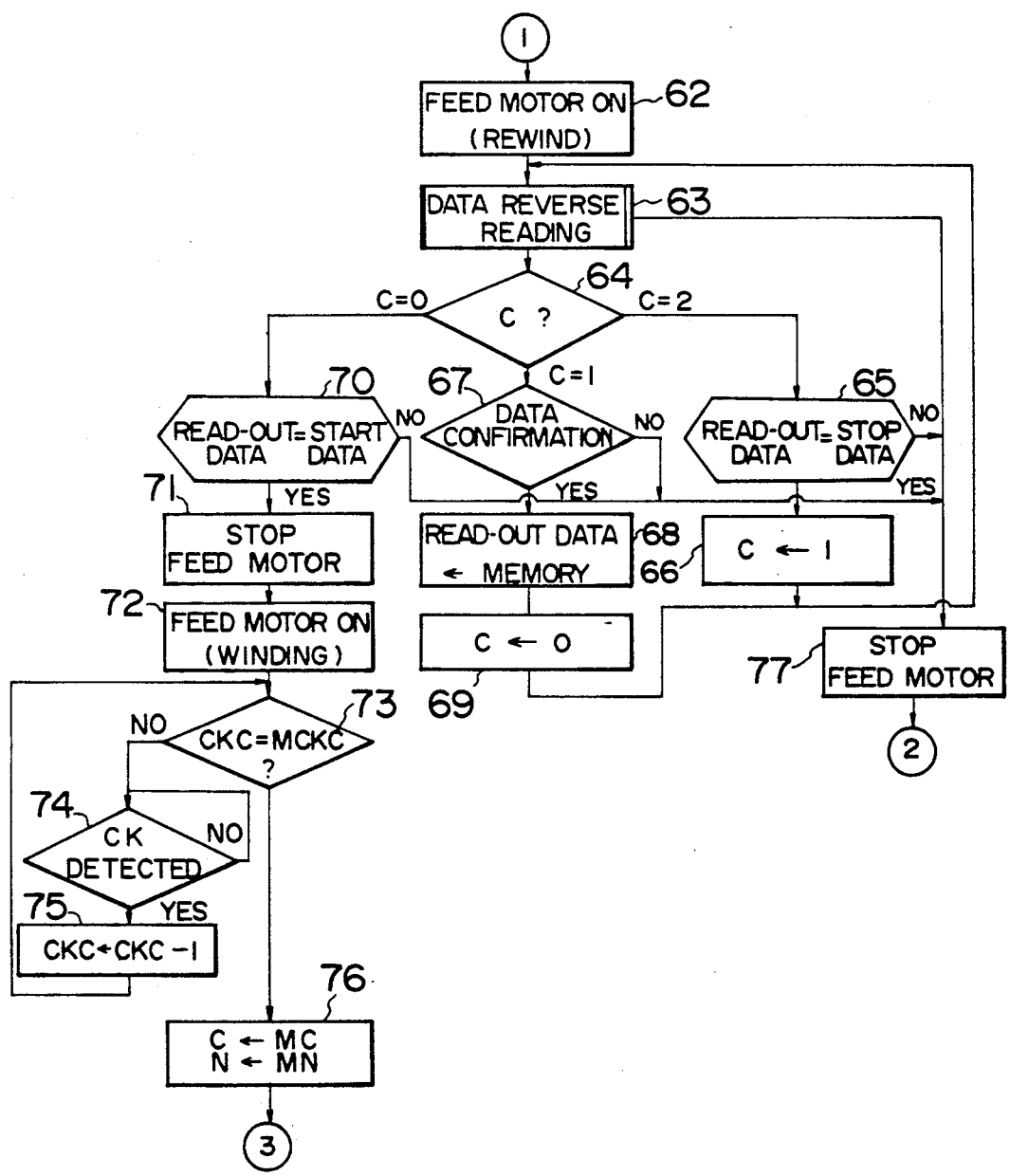

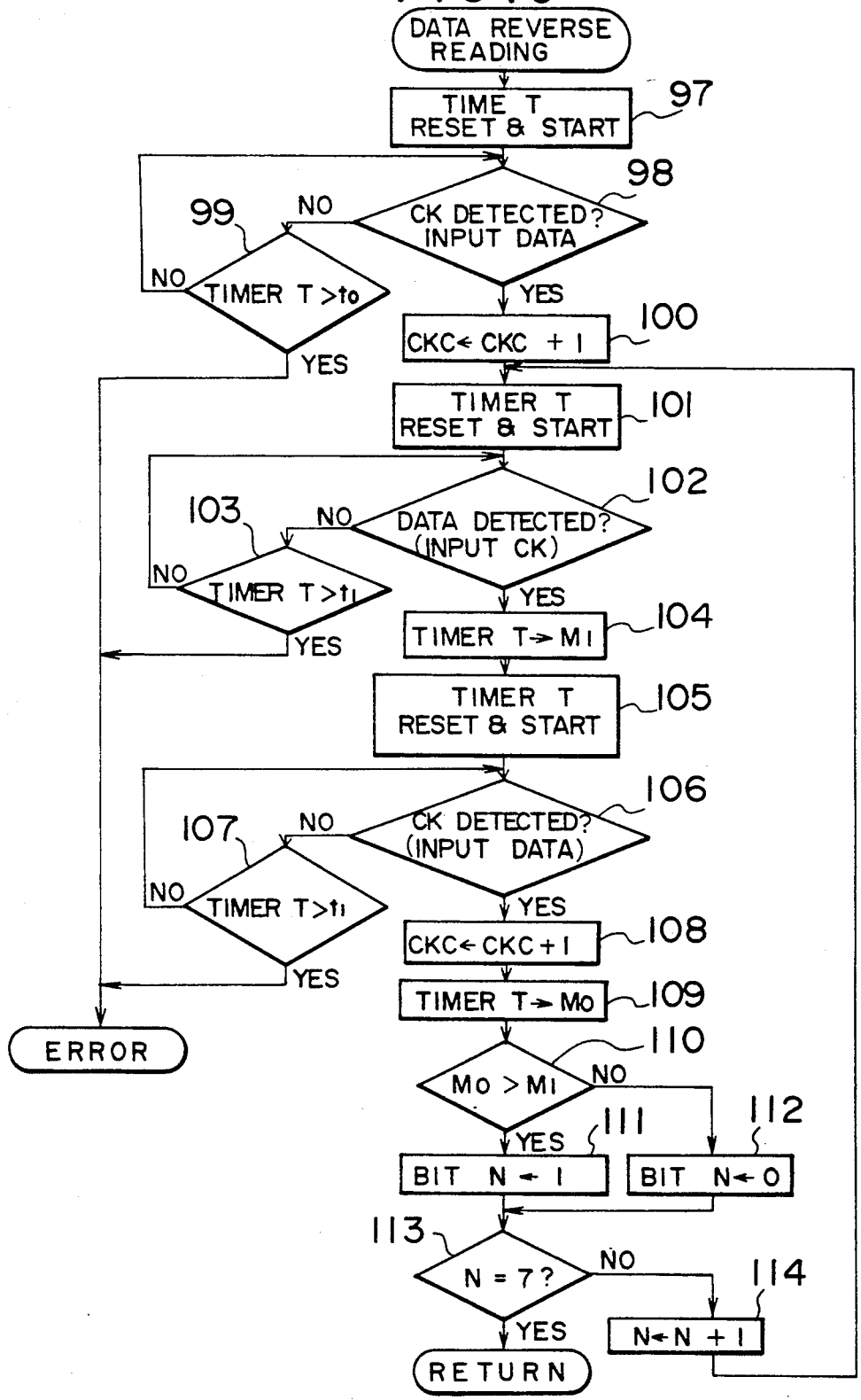

CAMERA USING FILM WITH MAGNETIC STORAGE PORTION

BACKGROUND OF THE INVENTION

1. Field of the Invention

The present invention relates to an improvement in a camera using a film with a magnetic storage portion, which can write or read out information to or from the magnetic storage portion of the film.

2. Related Background Art

A camera which uses a film comprising a magnetic storage portion, and can write or read out information to or from the magnetic storage portion by a magnetic head during a film feed operation is disclosed in U.S. Pat. No. 4,860,037.

In a camera of this type, when information already written in the magnetic storage portion of the film is read out by the magnetic head, some or all of the information may be erroneously read out due to, e.g., floating of the film from the magnetic head. In this case, since the camera later performs exposure control and other control operations on the basis of the erroneous information a proper exposure level cannot be obtained, and various other erroneous operations may be caused.

SUMMARY OF THE INVENTION

The present invention has been made in consideration of the above situation, and has as its object to provide a camera using a film with a magnetic storage portion, which comprises reading means for reading out information from the magnetic storage portion of the film, judgment means for judging whether the information has been properly read out by the reading means, and control means for feeding the film to a particular position when said judgment means judges that the information has not been properly read out at the particular position, and causing the reading means to repeat the reading operation at the particular position, and which can solve the above-mentioned problems, and can reliably read out accurate information from the magnetic storage portion of the film.

Other objects of the present invention will be apparent from embodiments to be described later.

BRIEF DESCRIPTION OF THE DRAWINGS

FIG. 1A is a front view showing the positional relationship between a film with a magnetic storage portion and a magnetic head in a camera according to an embodiment of the present invention;

FIG. 1B is an enlarged view of a portion A in FIG. 1A;

FIG. 1C is a sectional view taken along a line B—B, in FIG. 1B;

FIG. 2 is a block diagram of a camera according to the first embodiment of the present invention;

FIGS. 3a to 3e are waveform charts showing signal waveforms upon recording/re-formation on/from a magnetic storage portion;

FIG. 7 shows a data content to be recorded in this embodiment;

FIGS. 8A to 10 are flow charts showing operations in the second embodiment of the present invention.

DETAILED DESCRIPTION OF THE PREFERRED EMBODIMENTS

The preferred embodiments of the present invention will be described hereinafter with reference to the accompanying drawings.

Figure 4:
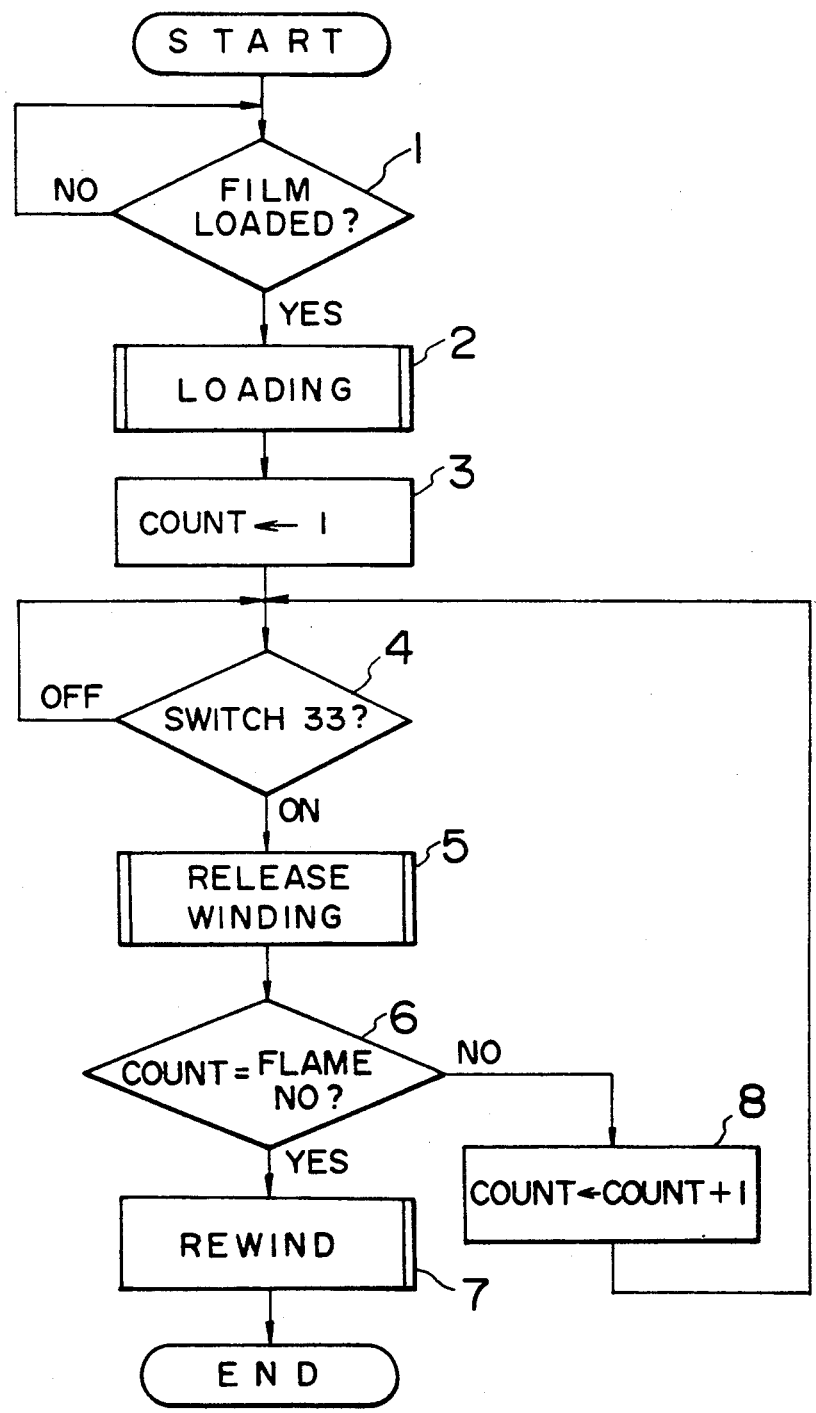
FIGS. 4 to 6 are flow charts showing operations of the first embodiment of the present invention.
Figure 5:
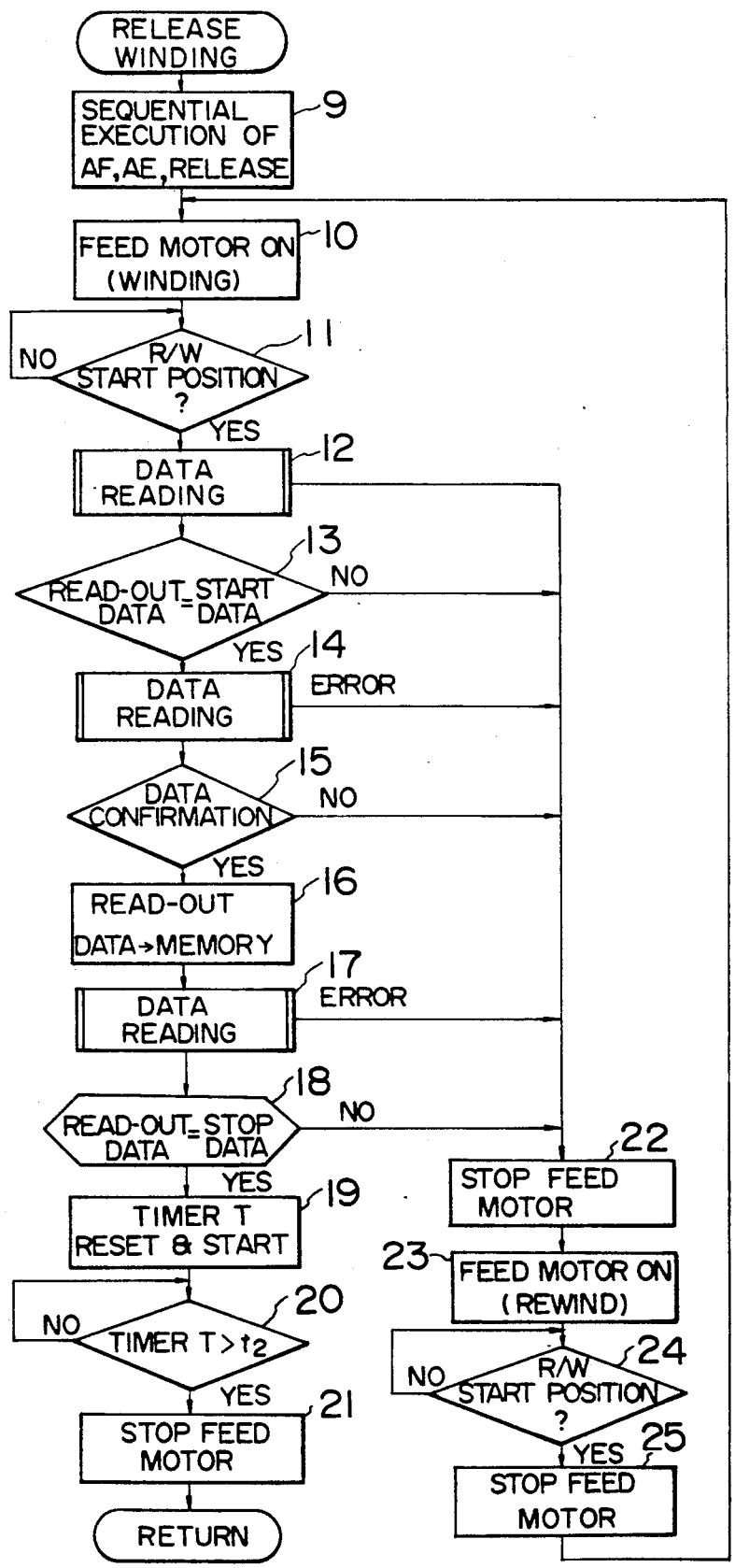
Figure 6:
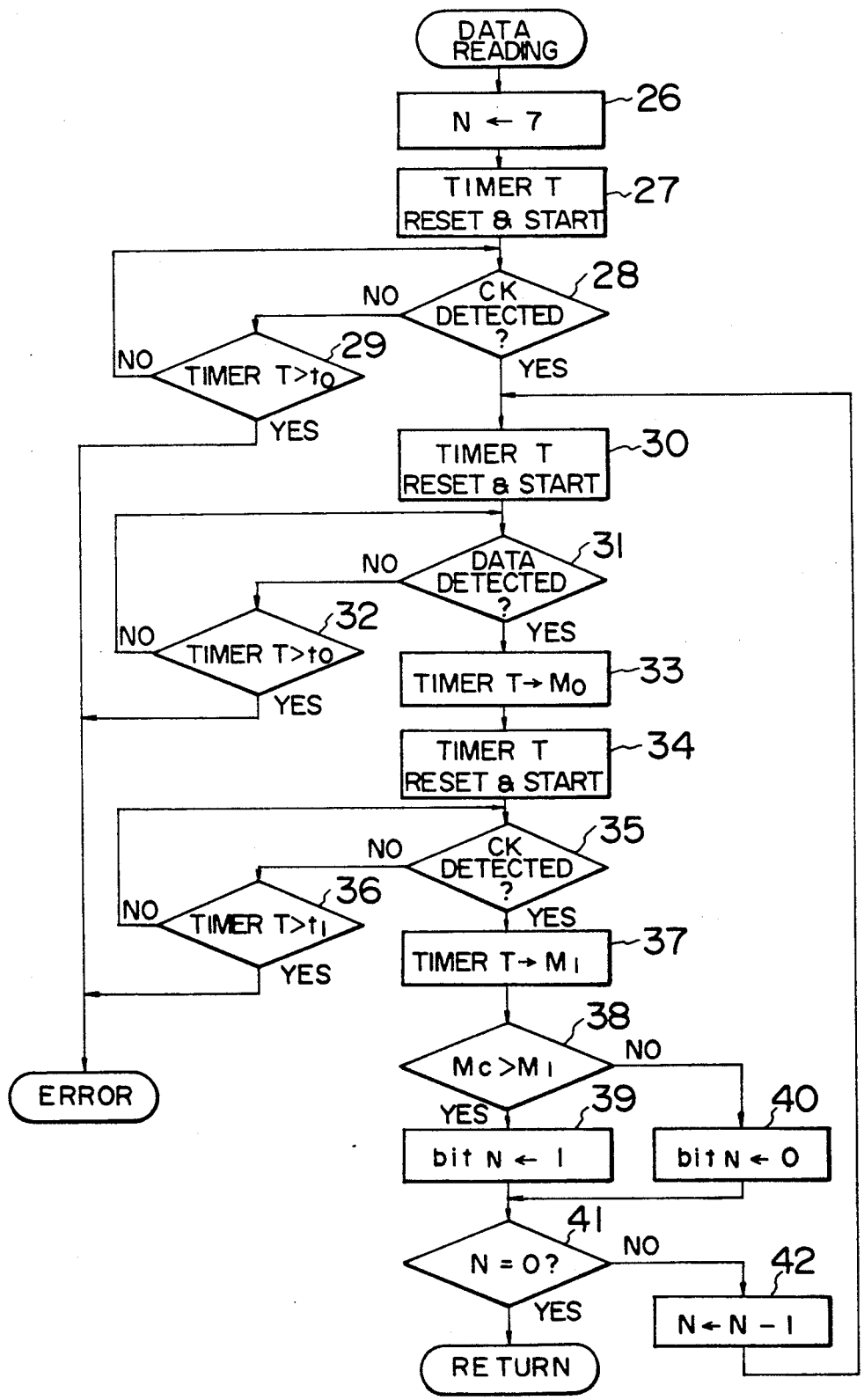

FIGS. 1A to 7 show the first embodiment of a camera according to the present invention. FIG. 1A is a front view showing the relationship between a film with a magnetic storage portion according to the present invention, and a magnetic head, FIG. 1B is an enlarged view of a portion A shown in FIG. 1A, FIG. 1C is a sectional view taken along a line B—B' in FIG. 1B, FIG. 2 is a block diagram of the first embodiment of the present invention, FIGS. 3a to 3e are waveform charts showing signal waveforms upon recording/re-formation to/from the magnetic storage portion, FIG. 4 is a flow chart showing an operation of the camera, FIG. 5 is a flow chart showing in detail a release-winding routine in FIG. 4, FIG. 6 is a flow chart showing in detail a data reading routine in FIG. 5, and FIG. 7 is a table showing a data content recorded in this embodiment.

In FIGS. 1A to 2, a magnetic head 1 includes a read/write magnetic head (R/W head) 10, and a write magnetic head (W head) 11. The magnetic head 1 sandwiches a film 3 with a magnetic head press pad 2 at the position of magnetic recording tracks 5 and 6 constituting a magnetic storage portion (FIG. 1B), as shown in FIG. 1C. The film 3 is fed by a film feed member (not shown), so that the magnetic head 1 traces the magnetic recording tracks 5 and 6 on the film 3.

A perforation 4 is formed in every image recording frame 7, i.e., in correspondence with each frame. A light-emitting diode 17 and a phototransistor 18 are arranged at a position where the perforation 4 passes, thereby detecting a read/write start position.

An operation of a read/write start position determination circuit 15 will be described below.

The light-emitting diode 17 emits light when a current determined by a resistor 16 and a power supply Vcc flows. When no light-shielding member, i.e., no film 3 is present between the light-emitting diode 17 and the phototransistor 18, a current flows through the phototransistor 18, and an NPN transistor 20 is turned on. Thus, an output P1 from the circuit 15 goes to a "1" level.

When the film 3 is present between the light-emitting diode 17 and the phototransistor 18, since no current flows through the phototransistor 18, the NPN transistor 20 is kept OFF. Thus, the output P1 from the circuit 15 goes to "0" level.

The above-mentioned R/W head 10 is used as a read head, and when the head 10 is driven, it generates a re-formed voltage waveform shown in FIG. 3b at one input terminal of a read amplifier 12. In this case, assume that information has already been recorded on the magnetic recording track 5 in a recording current waveform shown in FIG. 3A.

The read amplifier 12 detects a clock signal (FIG. 3c) on the basis of a negative value of a re-formed voltage waveform (FIG. 3b), and detects a data signal (FIG. 3d) on the basis of a positive value of the re-formed voltage waveform.

A write amplifier 14 supplies a recording current ±Io to the W head 11, as shown in FIG. 3e, thereby recording data in a micro computer 22 on the magnetic recording track 6.

As described above, in this embodiment, a magnetic recording/re-formation operation is performed by a so-called self clock method.

In FIG. 2, a motor driving circuit 23 turns on transistors 25 and 28, or transistors 26 and 27 according to an instruction of the micro computer 22 to supply a current to a feed motor 24, thus rotating the motor in the forward or reverse direction, and turns on the transistors 27 and 28 to establish a brake state. Thus, the circuit 23 performs driving control of the feed motor 24.

The feed motor 24 feeds the film 3 via a gear unit (not shown) in a winding direction when it is rotated in the forward direction, and in a rewinding direction when it is rotated in the reverse direction, depending on a current supplied through the transistors 25 to 28. Note that ring current diodes 29 to 32 are connected to the motor 24.

An AF·AE·release sequence block 34 executes an AF·AE·release sequence while communicating with the micro computer 22.

The operations of the above-mentioned arrangement will be described below with reference to the flow charts shown in FIGS. 4 to 6 showing the operations of the micro computer 22 shown in FIG. 2.

The overall operation of the camera will be described below with reference to FIG. 4.

"Step 1" Whether or not the film 3 is loaded is checked based on a state of a switch (not shown), and when it is determined that the film 3 is loaded, the following steps are executed.

"Step 2" The feed motor 24 is energized to wind up the film 3 to an initial position. That is, a known autoloading operation is performed.

"Step 3" A frame counter is set to be "1".

"Step 4" Whether or not a switch 33 (FIG. 2) corresponding to a release switch is turned on is checked. If it is determined that the switch 33 is ON, the following sequence is executed.

"Step 5" A series of photographing operations including AF, AE, shutter release, and film winding operations are performed. The photographing operations will be described i detail later.

"Step 6" It is checked if the content of the frame counter has reached a predetermined frame count of the film 3. If it is determined that the content of the frame counter has reached the predetermined frame count, the flow advances to step 7. Otherwise, the flow advances to step 8.

"Step 7" A rewinding operation of the film 3 is performed, and upon completion of the rewinding operation, the series of operations are ended.

"Step 8" The content of the frame counter is incremented by "+1", and the flow returns to step 4 to execute the photographing sequence for the next frame.

The AF, AE, shutter release, and film winding operations executed in step 5 in FIG. 4 will be described in detail below with reference to FIG. 5.

"Step 9" The AF, AE, and shutter release operations are executed.

"Step 10" The transistors 25 and 28 are turned on to supply a power supply current to the feed motor 24, thereby rotating the motor 24 in the forward direction, and starting the winding operation of the film 3 via the gear unit (not shown).

"Step 11" A change from "0" to "1" in output P1 from the read/write start position determining circuit 15 is detected.

"Step 12" Recorded data written in the magnetic storage portion (magnetic recording track 5 of the film 3 is read out, as will be described in detail later. As a result, if a re-formed signal can be detected, the flow advances to step 13; otherwise, the flow advances to step 22.

"Step 13" If the read-out data is start data indicating the start of recorded data, the flow advances to step 14; otherwise, the flow advances to step 22.

"Step 14" The next recorded data is read out, as will be described in detail later. As a result, if a re-formed signal can be detected, the flow advances to step 15; otherwise, the flow advances to step 22.

"Step 15" The read-out data represents, e.g., a film sensitivity, as shown in FIG. 7. However, if an actually read-out data code is a non-existent code, i.e., if data including bits "7" to "3"="00000" is obtained when codes are determined, as shown in FIG. 7, it is determined that a re-formed signal cannot be detected, and the flow advances to step 22. If a data code can be confirmed, the flow advances to step 16.

"Step 16" Read-out data are stored in the corresponding areas of a memory.

"Step 17" The next recorded data is read out, as will be described in detail later. As a result, if a re-formed signal can be detected, the flow advances to step 18; otherwise, the flow advances to step 22.

"Step 18" If read-out data is stop data indicating the end of terminating data of recorded data, the flow advances to step 19; otherwise, the flow advances to step 22.

"Step 19" A timer T (not shown) in the micro computer 22 is reset, and its count operation is then started.

"Step 20" It is checked if the content of the timer T is larger than a predetermined value $t_2$. If it is determined that the content of the timer T is larger than the value $t_2$, the flow advances to step 21. The timer value $t_2$ represents a time required for moving the next image recording frame 7 on the film 3 from a data reading end position to a photographing position.

"Step 21" The transistors 25 and 26 are turned off, and the transistors 27 and 28 are turned on to short-circuit the two terminals of the feed motor 24, thereby braking the motor 24. Thus, the winding operation is stopped.

When a re-formed signal cannot be detected, as described above, the flow advances to step 22.

"Step 22" Since it is determined that recorded data cannot be read out or cannot be normally read out due to any cause, the transistors 25 and 26 are turned off, and the transistors 27 and 28 are turned on to short-circuit the two terminals of the feed motor 24, thereby braking the motor. Thus, the film feed operation is stopped. The flow then advances to step 23.

"Step 23" The transistors 26 and 27 are turned on to supply a power supply current to the feed motor 24 in the reverse direction, thereby rotating the motor 24 in the reverse direction, and rewinding the film.

"Step 24" A change from "1" to "0" in output P1 from the read/write start position determining circuit 15 is detected. When "0" is detected, the flow advances to step 25.

"Step 25" Since it is detected that the film is returned to the reading start position, the transistors 25 and 26 are turned off, and the transistors 27 and 28 are turned on, thus braking the feed motor 24. As a result, the rewinding operation is stopped. Thereafter, the flow returns to step 10, the feed (winding) operation is started, and recorded data is read out again.

The data reading operation in steps 12, 14, and 17 in FIG. will be described below with reference to FIG. 6.

"Step 26" A data bit counter N is set to be "7".

"Step 27" The timer T (not shown) in the micro computer 22 is reset, and is then started.

"Step 28" It is checked if a clock signal CK in a recorded signal can be detected. If the clock signal CK cannot be detected, the flow advances to step 29; otherwise, the flow advances to step 30.

"Step 29" It is checked if a measurement time exceeds a predetermined value $t_0$ in a state wherein no clock signal CK is detected. If the measurement time exceeds $t_0$, it is determined that a re-formed signal cannot be read.

"Step 30" The timer T is reset again, and is then started.

"Step 31" A data signal in the recorded signal is detected. If the data signal can be detected, the flow advances to step 33; otherwise, the flow advances to step 32.

"Step 32" It is checked if a measurement time of the timer T, i.e., a time elapsed from generation of the clock signal CK exceeds a predetermined value $t_1$ in a state wherein no data signal is detected. If the time exceeds $t_1$, it is determined that a re-formed signal cannot be read. This timer value $t_1$ is an interval in which the clock signals CK should be detected, in other words, in which data are present.

"Step 33" A time measured by the timer T, i.e., an interval from generation of the clock signal CK to generation of the data signal is stored in a memory M0.

"Step 34" The timer T is reset again, and is then started.

"Step 35" It is checked if the clock signal CK in the recorded signal can be detected. If the clock signal CK cannot be detected, the flow advances to step 36; otherwise, the flow advances to step 37.

"Step 36" It is checked if a measurement time of the timer T exceeds the predetermined value $t_1$ in a state wherein no clock signal CK is detected. If the time exceeds $t_1$, it is determined that a re-formed signal cannot be read.

"Step 37" A time measured by the timer T, i.e., an interval from generation of the data signal to generation of the next clock signal CK is stored in a memory M1.

"Step 38" The contents of the memories are compared, and if M0>M1 is satisfied, i.e., if a data signal was generated in the latter half of the clock signal CK interval, the flow advances to step 39. If M0≦M1 is satisfied, i.e., if a data signal generated in the former half of the clock signal CK interval, the flow advances to step 40.

"Step 39" A bit N of data is set to be "1".

"Step 40" The bit N of data is set to be "0".

"Step 41" When the content of the data bit counter N becomes "0", i.e., when an input operation of 1-byte data is completed, the "data reading" routine is ended. On the other hand, if N has not reached "0" yet, the flow advances to step 42.

"Step 42" "N−1" is calculated, and the flow returns to step 30 to start detection of the next bit.

FIGS. 8A to 10 are flow charts showing operations of the second embodiment of the present invention. AF, AE, and release sequences, and a film winding operation shown in FIGS. 8A and 8B will be described below. Note that electrical block diagrams, and the like of this embodiment are the same as those in the first embodiment.

"Step 43" The AF·AE and shutter release operations are executed.

"Step 44" A data number C is set to be "0".

"Step 45" The transistors 25 and 28 are turned on to supply a power supply current to the feed motor 24 and to rotate the motor 24 in the forward direction, thereby starting a winding operation of the film 3 via the gear unit (not shown).

"Step 46" A change from "0" to "1" in output P1 from the read/write start position determining circuit 15 is detected.

"Step 47" A clock remaining count CKC is preset to "26".

"Step 48" A data bit count N is preset to "7".

"Step 49" Recorded data is read out, as will be described later. If a re-formed signal can be detected, the flow advances to step 50; otherwise, the flow advances to step 60.

"Step 50" The data number C is checked. As a result, if "C=0", the flow advances to step 51; if "C=1", the flow advances to step 53; and if "C=2", the flow advances to step 56.

"Step 51" If it is determined in step 50 that the data number C is "0", i.e., if the data number indicates the first byte data, the value of the data originally represents the start of the recorded data. If the data is not start data, the flow advances to step 60; otherwise, the flow advances to step 52.

"Step 52" The data number C is set to be "1", and the flow returns to step 48 to start the next data reading operation.

"Step 53" If it is determined in step 50 that the data number C is "1", i.e., if the data number indicates the second byte data, the data originally represents, e.g., a film sensitivity, as shown in FIG. 7. However, if an actually read-out data code is a non-existent code, i.e., if data including bits "7" to "3"="00000" is obtained, the read-out data is determined as erroneous data, and the flow advances to step 60. If normal data is read out, the flow advances to step 54.

"Step 54" Read-out data are stored in the corresponding areas of a memory, and are used in the next AF·AE and release operations.

"Step 55" The data number C is set to be "2", and the flow returns to step 48 to start the next data reading operation.

"Step 56" If it is determined in step 50 that the data number C is "2", i.e., if the third byte data is read out, the data is originally stop data indicating the end of recorded data. However, if the read-out data is not stop data, the flow advances to step 60. If the stop data is read out, the flow advances to step 57.

"Step 57" A timer T (not shown) in the micro computer 22 is reset, and its count operation is then started.

"Step 58" It is checked if the content of the timer T is larger than a predetermined value $t_2$. If the content of the timer T is larger than $t_2$, the flow advances to step 59. Note that the timer value $t_2$ represents a time required for moving the next image recording frame 7 on the film 3 from a reading end position to a photographing position, as described above.

"Step 59" The transistors 25 and 26 are turned off, and the transistors 27 and 28 are turned on to short-circuit the two terminals of the feed motor 24, thereby braking the motor to stop the film feed operation.

"Step 60" This step is executed when it is determined that recorded data cannot be read out or cannot be correctly read out due to any cause. In this case, the transistors 25 and 26 are turned off, and the transistors 27 and 28 are turned on to short-circuit the two terminals of the feed motor 24, thereby braking the motor to stop the film feed operation. The flow then advances to step 61.

"Step 61" In this step, the position of the film where the data reading operation cannot be performed is recorded. More specifically, the clock remaining count CKC is stored in a memory MCKC, the data number C is stored in a memory MC, and the data bit count N is stored in a memory MH.

"Step 62" The transistors 26 and 27 are turned on to supply a current to the feed motor 24 in the reverse direction, and to rotate the motor in the reverse direction, thereby rewinding the film 3.

"Step 63" In this step, recorded data is read out in the reverse direction. For this reason, since the positive and negative levels of a signal in a re-formed waveform are reversed, a signal read out as a clock signal CK in the winding operation is processed as a data signal, and a signal read out as a data signal is processed as the clock signal CK. When a re-formed signal cannot be detected, the flow advances to step 77.

"Step 64" The data number C is checked. As a result, if "C=0", the flow advances to step 70; if "C=1", the flow advances to step 67; and if "C=2", the flow advances to step 65.

"Step 65" If it is determined in step 64 that the data number C is "2", i.e., if the third byte data is read out, the data is originally stop data indicating the end of recorded data. If the read-out data is not stop data, the flow advances to step 77. If the stop data is normally read out, the flow advances to step 66.

"Step 66" The data number C is set to be "1", and the flow returns to step 63 to start the next data reading operation.

"Step 67" If it is determined in step 64 that the data number C is "1", i.e., if the second byte data is read out, the data originally represents, e.g., a film sensitivity, as shown in FIG. 7. However, if an actually read-out data code is a non-existent code, the flow advances to step 77. If normal data is read out, the flow advances to step 68.

"Step 68" Read-out data are stored in the corresponding areas of a memory, and are used in the next AF·AE and release operations.

"Step 69" The data number C is set to be "0", and the flow returns to step 63 to start the next data reading operation.

"Step 70" If it is determined in step 64 that the data number C is "0", i.e., if the first byte data is read out, the value is originally start data indicating the start of recorded data. If the start data cannot be read out, the flow advances to step 77. If the start data is normally read out, the flow advances to step 71.

"Step 71" The transistors 25 and 26 are turned off, and the transistors 27 and 28 are turned on to short-circuit the two terminals of the feed motor 24, thus braking and stopping the motor.

"Step 72" The transistors 25 and 28 are turned on to supply a power supply current, thereby rotating the feed motor 24 in the forward direction again. Thus, the winding operation of the film 3 is started.

"Step 73" Whether or not the film is returned to the position recorded in step 61 is checked by checking if the clock remaining count CKC coincides with MCKC. If the film is not returned yet, the flow advances to step 74; otherwise, the flow advances to step 76.

"Step 74" The clock signal CK is detected.

"Step 75" The value of the clock remaining count CKC is decremented by "1", and the flow returns to step 73.

The operations in steps 73 to 75 are repeated, and when the film is returned to the position recorded in step 61, the flow advances to step 76, as described above.

"Step 76" In this step, the data number C and the data bit count N are restored, and the flow returns to step 49 in FIG. 8A to start the subsequent data reading operation.

"Step 77" This step is executed when it is determined that recorded data cannot be read out or cannot be correctly read out due to any cause. In this case, the transistors 25 and 26 are turned off, and the transistors 27 and 28 are turned on to short-circuit the two terminals of the feed motor 24, thereby braking the motor to stop the film feed operation. The flow then advances to step 78 in FIG. 8A.

"Step 78" In this step, the transistors 25 and 28 are turned on to supply a power supply current to the feed motor 24, thereby rotating the motor in the forward direction again to wind up the film 3. The flow returns to step 49 to start the normal reading operation.

Figure 9:
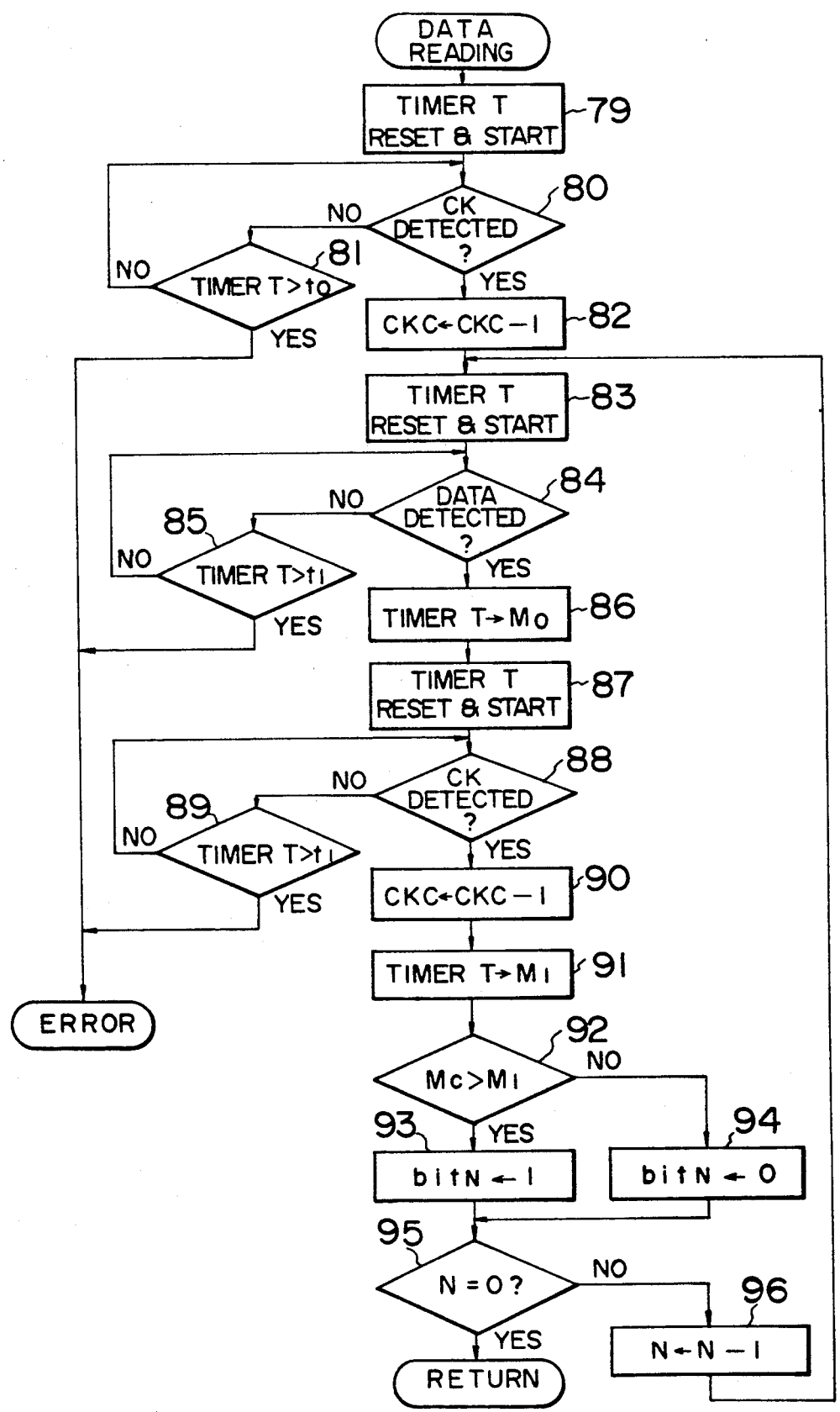

The data reading operation in step 49 in FIG. 8A will be described in detail below with reference to FIG. 9.

"Step 79" The timer T in the micro computer 22 is reset, and is then started.

"Step 80" It is checked if the clock signal CK in the recorded signal is detected. If the clock signal CK cannot be detected, the flow advances to step 81; otherwise, the flow advances to step 82.

"Step 81" It is checked if a measurement time of the timer T exceeds a predetermined value $t_0$ in a state wherein no clock signal CK is detected. If the time exceeds $t_0$, it is determined that a re-formed signal cannot be read.

"Step 82" The value of the clock remaining count CKC is decremented by "1".

"Step 83" The timer T is reset again, and is started.

"Step 84" A data signal in a recorded signal is detected. If the data signal can be detected, the flow advances to step 86; otherwise, the flow advances to step 85.

"Step 85" It is checked if a measurement time of the timer T, i.e., a time elapsed from generation of the clock signal CK exceeds a predetermined value $t_1$. If the time exceeds $t_1$, it is determined that a re-formed signal cannot be read. This timer value $t_1$ is an interval in which the clock signals CK should be detected, in other words, in which data are present.

"Step 86" A time measured by the timer T, i.e., an interval from generation of the clock signal CK to generation of the data signal is stored in a memory M0.

"Step 87" The timer T is reset again, and is then started

"Step 88" It is checked if the clock signal CK in the recorded signal can be detected. If the clock signal CK cannot be detected, the flow advances to step 89; otherwise, the flow advances to step 90.

"Step 89" It is checked if a measurement time of the timer T exceeds the predetermined value $t_1$ in a state wherein no clock signal CK is detected. If the time exceeds $t_1$, it is determined that a re-formed signal cannot be read.

"Step 90" The value of the clock remaining count CKC is decremented by "1".

"Step 91" A time measured by the timer T, i.e., an interval from generation of the data signal to generation of the next clock signal CK is stored in a memory M1.

"Step 92" The contents of the memories are compared, and if M0>M1 is satisfied, i.e., if a data signal was generated in the latter half of the clock signal CK interval, the flow advances to step 93. If M0≦M1 is satisfied, i.e., if a data signal was generated in the former half of the clock signal CK interval, the flow advances to step 94.

"Step 93" A bit N of data is set to be "1".

"Step 94" The bit N of data is set to be "0".

"Step 95" When the content of the data bit counter N becomes "0", i.e., when an input operation of 1-byte data is completed, the "data reading" routine is ended. On the other hand, if N has not reached "0" yet, the flow advances to step 96.

"Step 96" "N−1" is calculated, and the flow returns to step 83 to start detection of the next bit.

The data reverse reading operation in step 63 in FIG. 8B will be described in detail below with reference to FIG. 10.

"Step 97" The timer T (not shown) in the micro computer 22 is reset, and is then started.

"Step 98" It is checked if a clock signal CK (data signal input) in a recorded signal can be detected If the clock signal CK cannot be detected, the flow advances to step 99; otherwise, the flow advances to step 100.

"Step 99" It is checked if a measurement time of the timer T exceeds a predetermined value $t_0$ in a state wherein no clock signal CK is detected. If the time exceeds $t_0$, it is determined that a re-formed signal cannot be read.

"Step 100" The value of the clock remaining count CKC is incremented by "1".

"Step 101" The timer T is reset again, and is then started.

"Step 102" A data signal (clock signal CK) in the recorded signal is detected. If the data signal can be detected, the flow advances to step 104; otherwise, the flow advances to step 103.

"Step 103" It is checked if a measurement time of the timer T, i.e., a time elapsed from generation of the clock signal CK exceeds a predetermined value t in a state wherein no data signal is detected. If the time exceeds $t_1$, it is determined that a re-formed signal cannot be read. This timer value $t_1$ is an interval in which the clock signals CK should be detected, in other words, in which data are present.

"Step 104" A time measured by the timer T, i.e., an interval from generation of the clock signal CK to generation of the data signal is stored in the memory M1.

"Step 105" The timer T is reset again, and is then started.

"Step 106" It is checked if a clock signal CK (data signal input) in the recorded signal can be detected. If the clock signal CK cannot be detected, the flow advances to step 107; otherwise, the flow advances to step 108.

"Step 107" It is checked if the measurement time of the timer T exceeds the predetermined value $t_1$ in a state wherein no clock signal CK (data signal input) is detected. If the time exceeds $t_1$, it is determined that a re-formed signal cannot be read.

"Step 108" The value of the clock remaining count CKC is incremented by "1".

"Step 109" A time measured by the timer T, i.e., an interval from generation of the data signal (clock signal CK) to generation of the next clock signal CK (data signal) is stored in the memory M1.

"Step 110" The contents of the memories are compared, and if M0>M1 is satisfied, i.e., if a data signal was generated in the latter half (corresponding to the former half in the normal detection) of the clock signal CK interval, the flow advances to step 111. If M0≦M1 is satisfied, i.e., if a data signal was generated in the former half (corresponding to the latter half in the normal detection) of the clock signal CK interval, the flow advances to step 112.

"Step 111" A bit N of data is set to be "1".

"Step 112" The bit N of data is set to be "0".

"Step 113" When the content of the data bit counter N becomes "7", i.e., when an input operation of 1-byte data is completed, the "data reading" routine is ended. On the other hand, if N has not reached "7" yet, the flow advances to step 114.

"Step 114" "N+1" is calculated, and the flow returns to step 101 to start detection of the next bit.

FIGS. 11A to 13 are flow charts showing operations of the third embodiment of the present invention. AF, AE, and release sequences, and a film winding operation shown in FIGS. 11A and 11B will be described below. Note that electrical block diagrams, and the like of this embodiment are the same as those in the first and second embodiments.

"Step 115" The AF·AE and shutter release operations are executed.

"Step 116" An error flag E is reset to "0".

"Step 117" The transistors 25 and 28 are turned on to supply a power supply current to the feed motor 24, and to rotate the motor in the forward direction, thereby starting a winding operation of the film 3 via the gear unit (not shown).

"Step 118" A change from "0" to "1" in output P1 from the read/write start position determining circuit 15 is detected.

"Step 119" Recorded data written in the magnetic storage portion of the film 3 is read out, as will be described in detail later.

"Step 120" When the read-out data is start data indicating the start of recorded data, the flow advances to step 122; otherwise, the flow advances to step 121.

"Step 121" The error flag E is set to be "1".

"Step 122" The next recorded data is read out, as will be described in detail later.

"Step 123" The read-out data represents, e.g., a film sensitivity, as shown in FIG. 7. However, when an actually read-out data code is a non-existent code, i.e., when data including bits "7" to "3"="00000" is obtained when codes are determined, as shown in FIG. 7, it is determined that a re-formed signal cannot be detected, and the flow advances to step 125. If a data code can be confirmed, the flow advances to step 124.

"Step 124" The error flag E is set to be "1".

"Step 125" The read-out data are stored in the corresponding areas of a memory.

"Step 126" The next recorded data is read out, as will be described in detail later.

"Step 127" If the read-out data is stop data indicating the end of end data of the recorded data, the flow advances to step 129. If the read-out data is not stop data, the flow advances to step 128.

"Step 128" The error flag E is set to be "1".

"Step 129" The timer T (not shown) in the micro computer 22 is reset, and its count operation is then started.

"Step 130" It is checked if the content of the timer T is larger than a predetermined value $t_2$. If the content is larger than $t_2$, the flow advances to step 131. The timer value $t_2$ represents a time required for moving the next image recording frame 7 on the film 3 from a reading end position to a photographing position.

"Step 131" The transistors 25 and 26 are turned off, and the transistors 27 and 28 are turned on to short-circuit the two terminals of the feed motor 24, thus braking the motor to stop the winding operation.

"Step 132" The state of the error flag E is checked. As a result, if the flag E is "0", the operation is ended; if it is "1", the flow advances to step 133 in FIG. 11B.

"Step 133" The error flag E is set to be "0".

"Step 134" The transistors 26 and 27 are turned on to supply a power supply voltage to the feed motor 24, thus rotating the motor in the reverse direction to start the rewinding operation of the film 3 via the gear unit (not shown).

"Step 135" Recorded data is read out in the reverse direction, as will be described in detail later. For this reason, since the positive and negative levels of a signal in a re-formed waveform are reversed, a signal read out as a clock signal CK in the winding operation is processed as a data signal, and a signal read out as a data signal is processed as the clock signal CK.

"Step 136" If the read-out data is stop data indicating the end of recorded data, the flow advances to step 138; otherwise, the flow advances to step 137.

"Step 137" The error flag E is set to be "1".

"Step 138" Recorded data is read out in the reverse direction like in step 135.

"Step 139" The read-out data represents, e.g., a film sensitivity, as shown in FIG. 7. However, when an actually read-out data code is a non-existent code, it is determined that a re-formed signal cannot be detected, and the flow advances to step 140. If a data code can be confirmed, the flow advances to step 141.

"Step 140" The error flag E is set to be "1".

"Step 141" The read-out data are stored in the corresponding areas of a memory.

"Step 142" Recorded data is read out in the reverse direction like in steps 135 and 138.

"Step 143" If the read-out data is start data indicating the start of recorded data, the flow advances to step 145; otherwise, the flow advances to step 144.

"Step 144" The error flag E is set to be "1".

"Step 145" A change from "1" to "0" in output Pl from the read/write start position determining circuit 15 is detected.

"Step 146" The transistors 25 and 26 are turned off, and the transistors 27 and 28 are turned on to short-circuit the two terminals of the feed motor 24, thus braking the motor to stop the rewinding operation.

"Step 147" The state of the error flag E is checked. As a result, if the flag E is "0", the flow advances to step 148. If the flag E is "1", the flow returns to step 116 in FIG. 11A, and the reading operation is executed while rewinding the film again.

"Step 148" The transistors 25 and 28 are turned on to supply a power supply current to the feed motor 24, thus rotating the motor in the forward direction to start the winding operation of the film 3.

"Step 149" The timer T (not shown) in the micro computer 22 is reset, and its count operation is then started.

"Step 150" It is checked if the content of the timer T is larger than a predetermined value $t_3$. If the content is larger than $t_3$, the flow advances to step 151. Note that the timer value $t_3$ is a time required for winding up the image recording frame 7 of the film by one frame.

"Step 151" The transistors 25 and 26 are turned off, and the transistors 27 and 28 are turned on to short-circuit the two terminals of the feed motor 24, thus braking the motor to stop the film feed operation. Thereafter, the operation is ended.

Figure 11A:
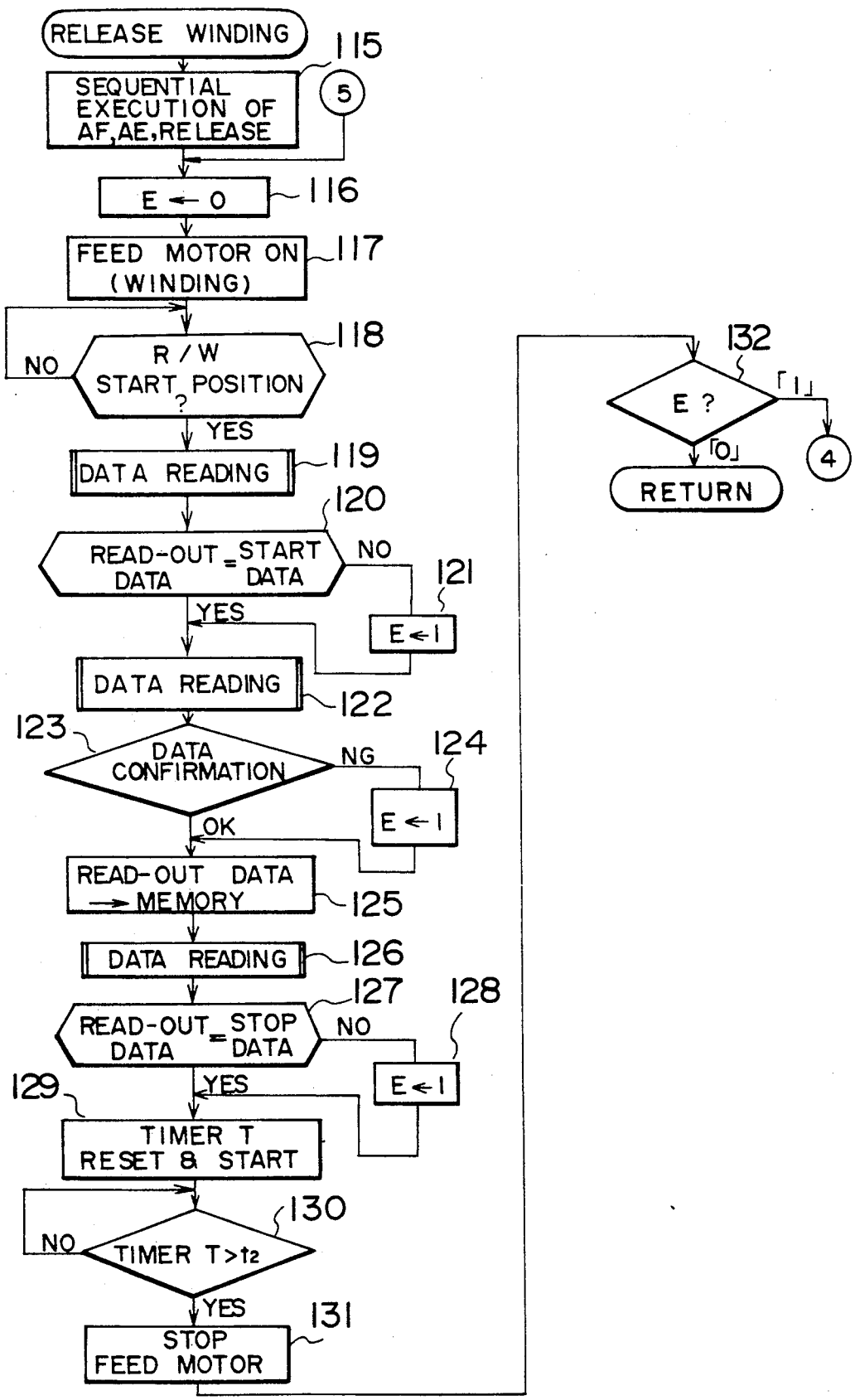
FIGS. 11A to 13 are flow charts showing operations in the third embodiment of the present invention.
Figure 12:
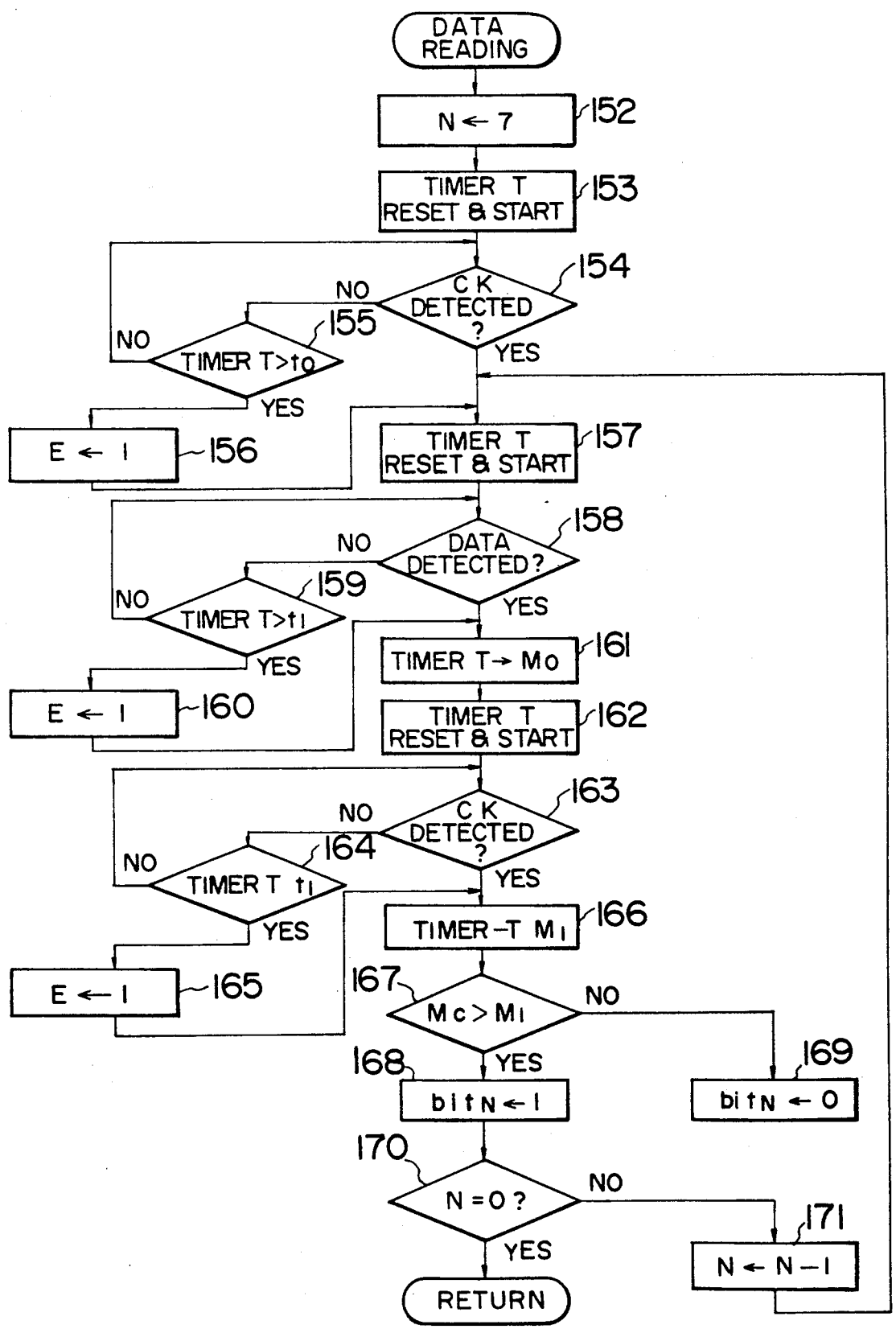

The data reading operation in steps 119, 122, and 126 in FIG. 11A will be described in detail below with reference to FIG. 12.

"Step 152" A data bit counter N is set to be "7".

"Step 153" The timer T (not shown) in the micro computer 22 is reset, and is then started.

"Step 154" It is checked if a clock signal CK in a recorded signal can be detected. If the clock signal CK cannot be detected, the flow advances to step 155; otherwise, the flow advances to step 157.

"Step 155" It is checked if a measurement time of the timer T exceeds a predetermined value $t_0$ in a state wherein no clock signal CK is detected. If the time exceeds $t_0$, it is determined that a re-formed signal cannot be read, and the flow advances to step 156.

"Step 156" The error flag E is set to be "1".

"Step 157" The timer T is reset again, and is then started.

"Step 158" A data signal in the recorded signal is detected. If the data signal can be detected, the flow advances to step 161; otherwise, the flow advances to step 159.

"Step 159" It is checked if a measurement time of the timer T, i.e., a time elapsed from generation of the clock signal CK exceeds a predetermined value t in a state wherein no data signal is detected. If the time exceeds t, it is determined that a re-formed signal cannot be read, and the flow advances to step 160.

"Step 160" The error flag E is set to be "1".

"Step 161" A time measured by the timer T, i.e., an interval from generation of the clock signal CK to generation of the data signal is stored in the memory M0.

"Step 162" The timer T is reset again, and is started.

"Step 163" It is checked if a clock signal CK in the recorded signal can be detected. If the clock signal CK cannot be detected, the flow advances to step 164; otherwise, the flow advances to step 166.

"Step 164" It is checked if a measurement time of the timer T, i.e., a time elapsed from generation of the data signal to generation of the next clock signal CK exceeds a predetermined value t in a state wherein the next clock signal CK cannot be detected. If the time exceeds t, the flow advances to step 165.

"Step 165" The error flag E is set to be "1".

"Step 166" A time measured by the timer T, i.e., an interval between generation of the data signal and generation of the next clock signal CK is stored in the memory M1.

"Step 167" The contents of the memories are compared, and if $M0 > M1$ is satisfied, i.e., if a data signal was generated in the latter half of the clock signal CK interval, the flow advances to step 168. If $M0 \leq M1$ is satisfied, i.e., if a data signal was generated in the former half of the clock signal CK interval, the flow advances to step 169.

"Step 168" A bit N of data is set to be "1".

"Step 169" The bit N of data is set to be "0".

"Step 170" When the content of the data bit counter N becomes "0", i.e., when an input operation of 1-byte data is completed, the "data reading" routine is ended. On the other hand, if N has not reached "0" yet, the flow advances to step 171.

"Step 171" "N−1" is calculated, and the flow returns to step 157 to start detection of the next bit.

Figure 11B:
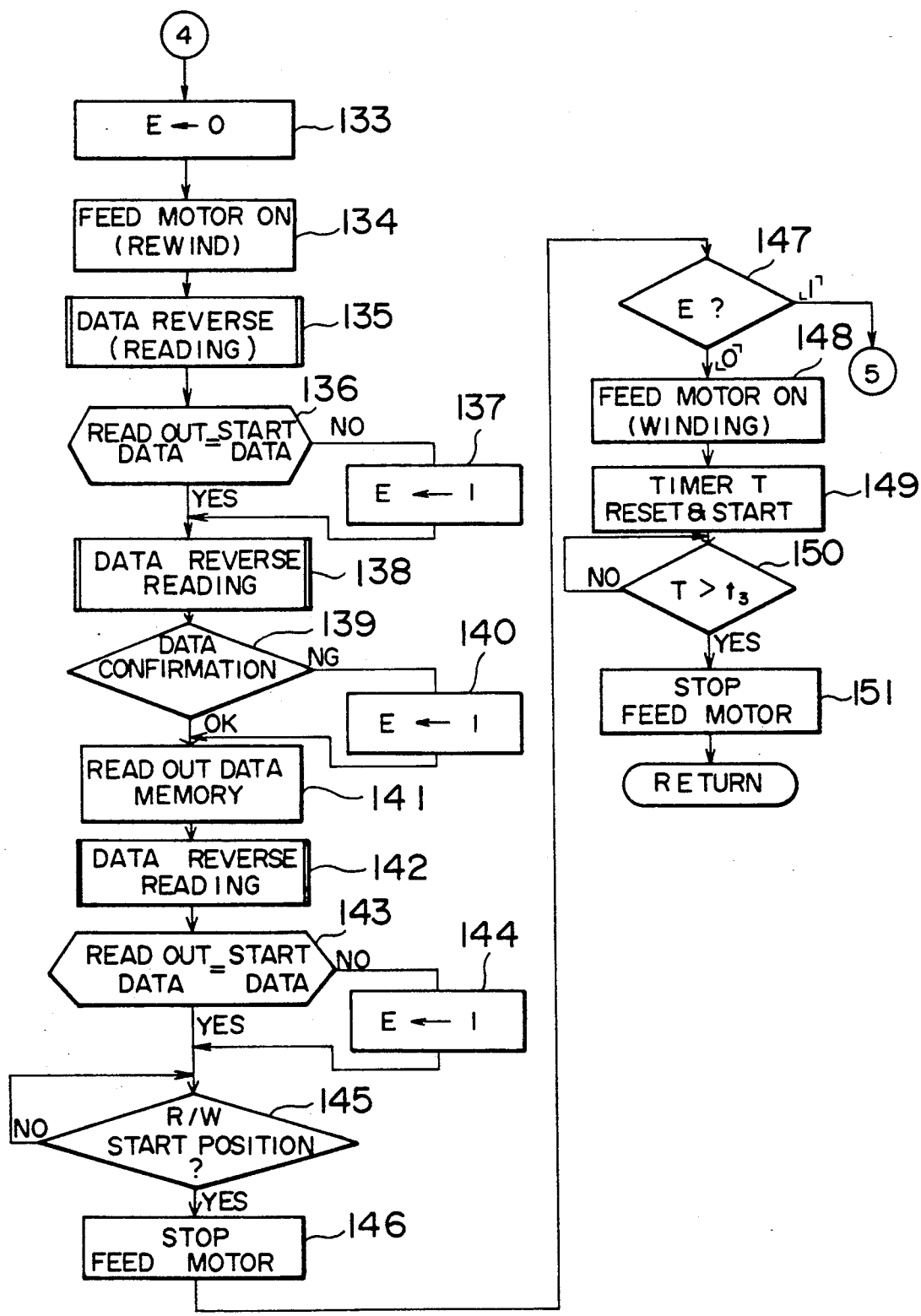
Figure 13:
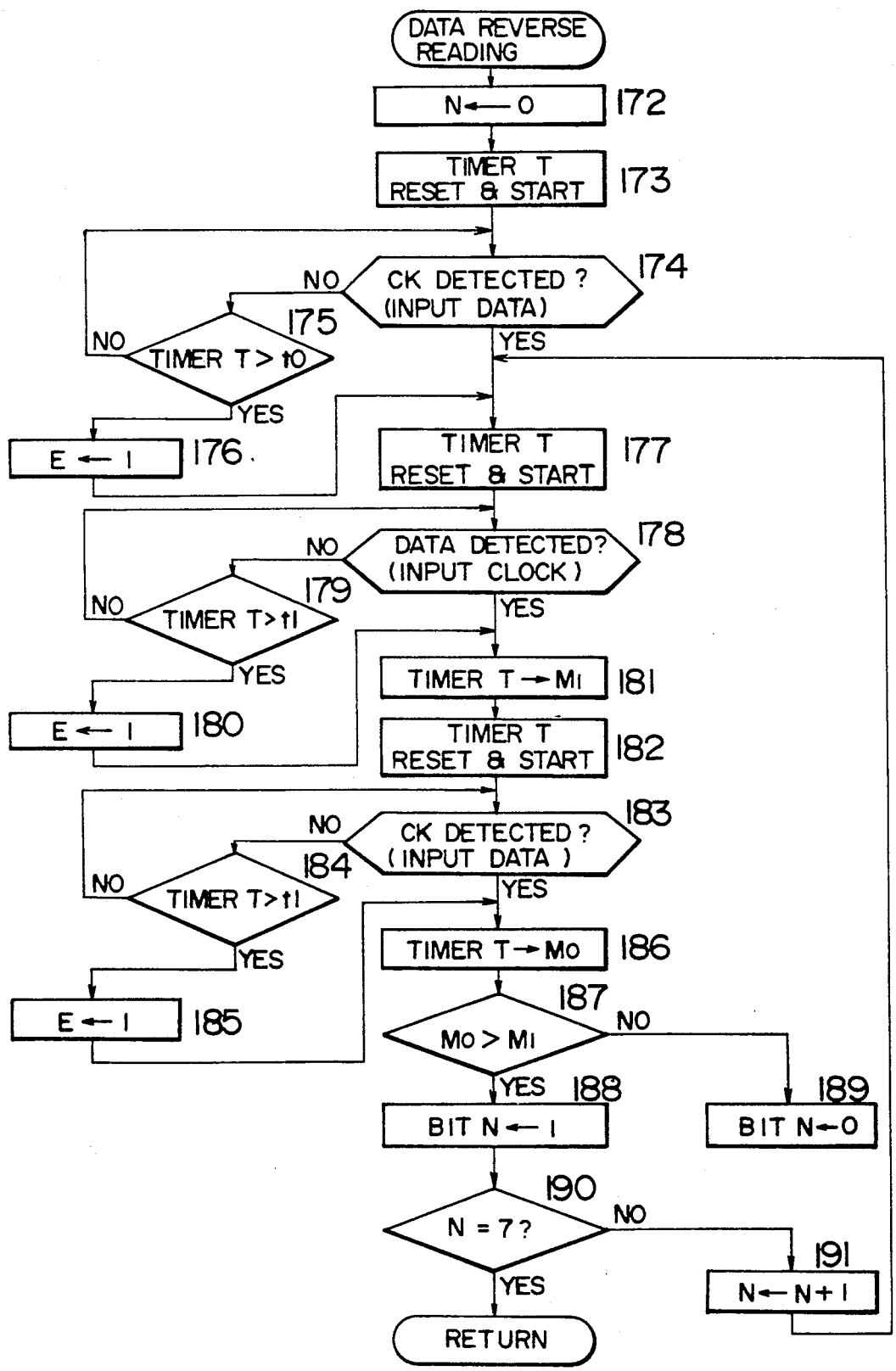

The data reverse reading operation in steps 135, 138, and 142 in FIG. 11B will be described in detail below with reference to FIG. 13.

"Step 172" A data bit counter N is set to be "0".

"Step 173" The timer T (not shown) in the microcomputer 22 is reset, and is then started. "Step 174" It is checked if a clock signal CK in a recorded signal can be detected. If the clock signal CK cannot be detected, the flow advances to step 175; otherwise, the flow advances to step 177.

"Step 175" It is checked if a measurement time of the timer T exceeds a predetermined value $t_0$ in a state wherein no clock signal CK (data signal input) is detected. If the time exceeds $t_0$, it is determined that a re-formed signal cannot be read, and the flow advances to step 176.

"Step 176" The error flag E is set to be "1".

"Step 177" The timer T is reset again, and is started.

"Step 178" A data signal (clock signal CK) in the recorded signal is detected. If the data signal can be detected, the flow advances to step 181; otherwise, the flow advances to step 179.

"Step 179" It is checked if a measurement time of the timer T, i.e., a time elapsed from generation of the clock signal CK exceeds a predetermined value $t_1$ in a state wherein no data signal (clock signal CK) is detected. If the time exceeds $t_1$, it is determined that a re-formed signal cannot be read, and the flow advances to step 180.

"Step 180" The error flag E is set to be "1".

"Step 181" A time measured by the timer T, i.e., an interval between generation of the clock signal CK and generation of the data signal is stored in the memory M1.

"Step 182" The timer T is reset again, and is started.

"Step 183" It is checked if a clock signal CK (data signal input) in the recorded signal can be detected. If the clock signal CK cannot be detected, the flow advances to step 184; otherwise, the flow advances to step 186.

"Step 184" It is checked if a measurement time of the timer T, i.e., a time elapsed from generation of the data signal to generation of the next clock signal CK exceeds a predetermined value $t_1$. If the time exceeds $t_1$, the flow advances to step 185.

"Step 185" The error flag E is set to be "1".

"Step 186" A time measured by the timer T, i.e., an interval from generation of the data signal (clock signal CK) to generation of the next clock signal CK (data signal input) is stored in the memory M1.

"Step 187" The contents of the memories are compared, and if M0>M1 is satisfied, i.e., if a data signal was generated in the latter half (corresponding to the former half in the normal detection) of the clock signal CK interval, the flow advances to step 188. If M0≦M1 is satisfied, i.e., if a data signal was generated in the former half (corresponding to the latter half in the normal detection) of the clock signal CK interval, the flow advances to step 189.

"Step 188" A bit N of data is set to be "1".

"Step 189" The bit N of data is set to be "0".

"Step 190" When the content of the data bit counter N becomes "0", i.e., when an input operation of 1-byte data is completed, the "data reading" routine is ended. On the other hand, if N has not reached "0" yet, the flow advances to step 191.

"Step 191" "N−1" is calculated, and the flow returns to step 177 to start the next bit detection.

According to the above-mentioned embodiments, when it is determined that recorded data cannot be normally re-formed, a film is rewound, and is repetitively re-formed. Therefore, accurate re-formed data can be reliably obtained, and hence, control operations of a camera using the re-formed data can always be normally performed without erroneous operations.

When data is repetitively re-formed, it is also re-formed while feeding a film in a direction opposite to that in the previous re-formation. Therefore, a high-speed reading operation can be performed, and since the feed direction is reversed, a contact state between a magnetic head and a magnetic recording layer can be changed from a previous state. Therefore, the probability of reading out normal data can be further improved.

Note that each of the above embodiments exemplifies a data reading operation. However, the present invention can be similarly applied to a data write operation.

What is claimed is:

1. A camera using a film with a magnetic storage portion, comprising:
   (A) reading means for reading out information from said magnetic storage portion of said film;
   (B) judgment means for judging whether the information has been properly read out by said reading means; and
   (C) control means for feeding said film to a particular position when said judgment means judges that the information has not been properly read out at the particular position, and causing said reading means to repeat the reading operation at the particular position.

2. A camera according to claim 1, wherein said reading means includes means for performing the reading operation during a feed operation of the film.

3. A camera according to claim 1, wherein said judgment means includes means for judging whether or not said reading means can confirm a presence of information in said magnetic storage portion of said film.

4. A camera according to claim 3, wherein said judgment means includes means for judging whether or not a content of the information read out by said reading means is proper.

5. A camera according to claim 1, wherein said judgment means includes means for judging whether or not a content of the information read out by said reading means is proper.

6. A camera according to claim 2, wherein said control means includes means for, when said judgment means judges that the reading operation of the information is not properly performed, causing said reading means to perform the reading operation again while feeding said film in the same direction as a feed direction of said film when the information is not properly read out.

7. A camera according to claim 2, wherein said control means includes means for, when said judgment means judges that the reading operation of the information is not properly performed, causing said reading means to perform the reading operation again while feeding said film in a direction opposite to a feed direction of said film when the information is not properly read out.

8. A camera according to claim 1, wherein, when said judgment means judges that the information has not been properly read out, said control means feeds the film in a direction reverse to a direction in the reading operation until a predetermined reference position of a frame in which said data reading was not properly performed, and the information reading is again executed while feeding the film toward the information reading direction from the predetermined reference position.

9. A camera using a film with a magnetic storage portion, comprising:
  (A) a magnetic head which is operated on said magnetic storage portion of said film;
  (B) judgment means for judging whether said magnetic head has been properly operated; and
  (C) control means for feeding said film to a particular position when said judgment means judges that the magnetic head has not been properly operated at the particular position, and operating said magnetic head again.

10. A camera according to claim 9, wherein said magnetic head includes means which is operated during a feed operation of said film.

11. A camera according to claim 10, wherein said control means includes means for, when said judgment means judges that said magnetic head is not properly operated, operating said magnetic head again while feeding said film in the same direction as a feed direction of said film when said magnetic head is not properly operated.

12. A camera according to claim 10, wherein said control means includes means for, when said judgment means judges that said magnetic head is not properly operated, operating said magnetic head again while feeding said film in a direction opposite to a feed direction of said film when said magnetic head is not properly operated.

13. A camera according to claim 9, wherein, when said judgment means judges that said magnetic head has not been properly operated, said control means reversely feeds the film until a predetermined reference position of a frame to which said magnetic head has not been properly operated, said head again being operated on said magnetic storage portion of said frame included between the reference position and the particular position while the film is again fed relative to said magnetic head from the reference position to the particular position.

14. A control apparatus for a camera using a film with a magnetic storage portion, comprising:
  (A) reading means for reading out information from said magnetic storage portion of said film;
  (B) judgment means for judging whether the information has been properly read out by said reading means; and
  (C) control means for feeding said film to a particular position when said judgment means judges that the information has not been properly read out at the particular position and causing said reading means to repeat the reading operation at the particular position.

15. An apparatus according to claim 14, wherein said reading means includes means for performing the reading operation during a feed operation of the film.

16. An apparatus according to claim 14, wherein said judgment means includes means for judging whether or not said reading means can confirm a presence of information in said magnetic storage portion of said film.

17. An apparatus according to claim 16, wherein said judgment means includes means for judging whether or not a content of the information read out by said reading means is proper.

18. An apparatus according to claim 14, wherein said judgment means includes means for judging whether or not a content of the information read out by said reading means is proper.

19. An apparatus according to claim 15, wherein said control means includes means for, when said judgment means judges that the reading operation of the information is not properly performed, causing said reading means to perform the reading operation again while feeding said film in the same direction as a feed direction of said film when the information is not properly read out.

20. Apparatus according to claim 15, wherein said control means includes means for, when said judgment means judges that the reading operation of the information is not properly performed, causing said reading means to perform the reading operation again while feeding said film in a direction opposite to a feed direction of said film when the information is not properly read out.

21. A camera according to claim 14, wherein, when said judgment means judges that the information has not been properly read out, said control means feeds the film in a direction reverse to the direction in said reading operation until a predetermined reference position of the frame to which said data reading was not properly performed, and the informed reading is again executed while feeding the film toward the information reading direction from the predetermined reference position.

22. An apparatus for a camera using a film with a magnetic storage portion, comprising:
  (A) a magnetic head which is operated on said magnetic storage portion of said film;
  (B) judgment means for judging whether said magnetic head has been properly operated; and
  (C) control means for feeding said film to a particular position when said judgment means judges that said magnetic head has not been properly operated at the particular position, and operating said magnetic head again.

23. An apparatus according to claim 22, wherein said magnetic head includes means which is operated during a feed operation of said film.

24. An apparatus according to claim 23, wherein said control means includes means for, when said judgment means judges that said magnetic head is not properly operated, operating said magnetic head again while feeding said film in the same direction as a feed direction of said film when said magnetic head is not properly operated.

25. An apparatus according to claim 23, wherein said control means includes means for, when said judgment means judges that said magnetic head is not properly operated, operating said magnetic head again while feeding said film in a direction opposite to a feed direction of said film when said magnetic head is not properly operated.

26. A camera according to claim 22, wherein, when said judgment means judges that said magnetic head has not been properly operated, said control means reversely feeds the film until a predetermined reference position of a frame to which said magnetic head has not been properly operated, said head again being operated on said magnetic storage portion of said frame included between said reference position and the particular position while the film is again fed relative to said magnetic head from the reference position to the particular position.

* * * * *

UNITED STATES PATENT AND TRADEMARK OFFICE
CERTIFICATE OF CORRECTION

PATENT NO. : 5,220,367
DATED : June 15, 1993
INVENTOR(S) : SHINICHI MATSUYAMA

It is certified that error appears in the above-indentified patent and that said Letters Patent is hereby corrected as shown below:

In the drawing:

SHEET 4:

Line F4, "FLAME," should read --FRAME--.

SHEET 7:

Line F7, "FLAME," should read --FRAME--.

COLUMN 1:

Line 24, "information" should read --information,--.

COLUMN 3:

Line 42, "i detail" should read --in detail--.

COLUMN 8:

Line 1, "started" should read --started.--.

COLUMN 9:

Line 48, "value t" should read --value t,--.

UNITED STATES PATENT AND TRADEMARK OFFICE
CERTIFICATE OF CORRECTION

PATENT NO. : 5,220,367
DATED : June 15, 1993
INVENTOR(S) : SHINICHI MATSUYAMA

It is certified that error appears in the above-indentified patent and that said Letters Patent is hereby corrected as shown below:

COLUMN 12:

Line 38, "value t" should read --value $t_1$--.
   Line 39, "exceeds t" should read --exceeds $t_1$,--.
   Line 40, ", it" should read --it--.
   Line 54, "value t" should read --value $t_1$--.
   Line 56, "value t" should read --value $t_1$,--.

COLUMN 16:

Line 21, "Apparatus" should read --An apparatus--.

Signed and Sealed this

Twelfth Day of April, 1994

Attest:

BRUCE LEHMAN

Attesting Officer

Commissioner of Patents and Trademarks